United States Patent
Klemmer et al.

(10) Patent No.: US 6,849,349 B2
(45) Date of Patent: Feb. 1, 2005

(54) MAGNETIC FILMS HAVING MAGNETIC AND NON-MAGNETIC REGIONS AND METHOD OF PRODUCING SUCH FILMS BY ION IRRADIATION

(75) Inventors: Timothy John Klemmer, Pittsburgh, PA (US); Ganping Ju, Wexford, PA (US); René Johannes Marinus van de Veerdonk, Pittsburgh, PA (US); Todd Dennis Leonhardt, Pittsburgh, PA (US); David Eugene Laughlin, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/274,768

(22) Filed: Oct. 21, 2002

(65) Prior Publication Data

US 2003/0113524 A1 Jun. 19, 2003

Related U.S. Application Data

(60) Provisional application No. 60/337,573, filed on Oct. 22, 2001.

(51) Int. Cl.[7] .............................. G11B 5/66; G11B 5/70; H01J 1/00
(52) U.S. Cl. .................... 428/694 T; 428/611; 428/900
(58) Field of Search ............................ 428/694 T, 611, 428/900

(56) References Cited

U.S. PATENT DOCUMENTS

| | | | |
|---|---|---|---|
| 4,920,013 A | 4/1990 | Kobayashi et al. | |
| 5,500,296 A | 3/1996 | Inoue et al. | |
| 5,538,802 A | 7/1996 | Kitaori et al. | |
| 5,543,203 A | 8/1996 | Tani et al. | |
| 5,587,223 A | 12/1996 | White | |
| 5,768,075 A | 6/1998 | Bar-Gadda | |
| 5,820,769 A | 10/1998 | Chou | |
| 5,981,055 A | 11/1999 | Yoshida | |
| 6,007,623 A | 12/1999 | Thiele et al. | |
| 6,086,974 A | 7/2000 | Thiele et al. | |
| 6,166,885 A | 12/2000 | Yamamoto et al. | |
| 6,183,893 B1 | 2/2001 | Futamoto et al. | |
| 6,258,434 B1 | 7/2001 | Hayashi | |
| 6,331,364 B1 | 12/2001 | Baglin et al. | |
| 6,383,597 B1 | 5/2002 | Fullerton et al. | |
| 6,383,598 B1 | 5/2002 | Fullerton et al. | |
| 6,391,430 B1 | 5/2002 | Fullerton et al. | |
| 6,440,520 B1 | 8/2002 | Baglin et al. | |
| 6,500,497 B1 | 12/2002 | Wang et al. | |

FOREIGN PATENT DOCUMENTS

JP    7-021544    1/1995

OTHER PUBLICATIONS

Kato et al., "MAgnetic Properties of Polycrystalline and Epitaxial Cr1–xMnxPt3 Alloy Films", Jul. 2001, IEEE Trans Magn, vol. 37, No. 4, pp. 2414–2416.*

(List continued on next page.)

*Primary Examiner*—Holly Rickman
(74) *Attorney, Agent, or Firm*—Alan G. Towner, Esq.; Pietragallo, Bosick & Gordon

(57) ABSTRACT

Magnetic films having magnetic regions and non-magnetic regions are disclosed. The film is subjected to ion irradiation in order to produce chemically disordered regions in the film. The irradiated disordered regions may correspond to the non-magnetic regions of the film. Alternatively, the irradiated disordered regions may correspond to the magnetic regions of the film. In one embodiment, portions of a magnetic $CrPt_3$ film are converted to non-magnetic regions by irradiating the regions with boron ions which disorder the $CrPt_3$ film in the treated regions. The film may be patterned into magnetic regions and non-magnetic regions for applications such as magnetic recording media in computer disc drive systems.

11 Claims, 5 Drawing Sheets

OTHER PUBLICATIONS

Huang et al., "High Coercivity and High Saturation Magnetization Mn–Al Thin Films", Sep. 1995, IEEE Tran Magn, vol. 31, No. 5, pp. 2494–2498.*

C. Chappert et al., Planar Patterned Magnetic Media Obtained by Ion Irradiation, *Science*, vol. 280, Jun. 19, 1998, pp. 1919–1922.

T. D. Leonhardt et al., "$CrPt_3$ Thin Film Media for Perpendicular or Magneto–Optical Recording," *Journal of Applied Physics*, vol. 85, Apr. 15, 1999, pp. 4307–4309.

T. Devolder et al., "Sub–50 nm Planar Magnetic Nanostructures Fabricated by Ion Irradiation," *Applied Physics Letters*, vol. 75, No. 3, Jul. 19, 1999, pp. 403–405.

B. D. Terris et al., "Ion–Beam Patterning of Magnetic Films Using Stencil Masks," *Applied Physics Letters*, vol. 75, No. 3, Jul. 19, 1999, pp. 403–405.

C. Chappert, "Ion Beam Induced Magnetic Thin Films Patterning," Seminar at Seagate Research, San Jose, CA, Oct. 20, 1999.

T. Devolder et al., "Patterning of Planar Magnetic Nanostructures by Ion Irradiation," *J. Vac. Sci. Technol. B*, vol. 17, No. 6, Nov./Dec. 1999, pp. 3177–3181.

H. Bernas et al., "Ion Beam Induced Magnetic Nanostructures Patterning," *Nucl. Instr. and Meth. in Phys. Res. B*, vol. 148, 1999, pp. 872–879.

G. Hughes, "Patterned Media," *Physics of Magnetic Recording*, Feb. 2, 2001, pp. 1–27.

O. Hellwig et al., "Magnetic Patterning of Chemically–Ordered $CrPt_3$ Films," *Applied Physics Letters*, vol. 79, No. 8, Aug. 20, 2001, pp. 1151–1153.

Terris et al., "Patterning magnetic films by ion beam irradiation", *Journal of Applied Physics*, May 2000, pp. 7004–7006, vol. 87, No. 9.

* cited by examiner

US 6,849,349 B2

MAGNETIC FILMS HAVING MAGNETIC AND NON-MAGNETIC REGIONS AND METHOD OF PRODUCING SUCH FILMS BY ION IRRADIATION

CROSS REFERENCE TO RELATED APPLICATION

This application claims the benefit of U.S. Provisional Patent Application Ser. No. 60/337,573 filed Oct. 22, 2001.

FIELD OF THE INVENTION

The present invention relates to magnetic films having magnetic and non-magnetic regions, and more particularly relates to the production of such films by an ion irradiation process which yields ordered and disordered regions in the films. The films are useful for applications such as magnetic recording media in computer disc drive systems.

BACKGROUND INFORMATION

In current magnetic recording media, growth in areal density has been accomplished by the reduction of grain size of the magnetic recording films while maintaining similar numbers of grains per bit, which is needed to fulfill signal to noise ratio (SNR) requirements. However, continued scaling down of the grain size will lead to thermal instability, which is generally referred to as the superparamagnetic limit.

One approach to circumvent the supermagnetic limit would be to pattern the media into isolated magnetic bits that behave as single magnetic entities, rather than hundreds of weakly coupled grains. It would be desirable, for ultra-high density magnetic recording, to pattern the magnetic media into de-coupled magnetic islands surrounded by non-magnetic material.

The present invention has been developed in view of the foregoing.

SUMMARY OF THE INVENTION

In accordance with the present invention, a film of material can be selectively modified from magnetic to non-magnetic/weakly magnetic, or vice versa, by an ion irradiation process. The ion irradiation causes a chemically ordered phase to randomize the structure into a chemically disordered phase. Additionally, the order to disorder transformation also changes the magnetic properties of the material. For example, regions of the film not exposed to the ion irradiation can be chemically ordered and magnetic (ferromagnetic or ferrimagnetic) while regions exposed to the irradiation become chemically disordered and non-magnetic (paramagnetic, antiferromagnetic or diamagnetic). Another possibility is that the chemically ordered regions are non-magnetic and the ion irradiated and chemically disordered regions are magnetic. Such materials may be used in magnetic storage media, both for disc-drive and probe storage type applications.

In one embodiment, the film has magnetically decoupled magnetic regions with non-magnetic regions therebetween. The non-magnetic regions may correspond to discrete regions that have been selectively irradiated in a desired pattern. Alternatively, the non-magnetic regions may represent grain boundary regions of a film that has been subjected to uniform irradiation across its entire surface.

An aspect of the present invention is to provide a magnetic recording medium comprising a substrate and an ion irradiated magnetic recording film on the substrate, wherein the film comprises magnetic regions and non-magnetic regions.

Another aspect of the present invention is to provide an ion irradiated magnetic film comprising magnetic regions and non-magnetic regions, wherein the film comprises an alloy which has undergone an ordered to disordered transformation and a resultant magnetic transformation. Typical films include alloys selected from Cr, Mn, Fe, Co and Ni alloys.

A further aspect of the present invention is provide a method of making a magnetic film having magnetic and non-magnetic regions. The method comprises subjecting at least a portion of the film to ion irradiation in order to convert regions of the film from a chemically ordered material to a chemically disordered material, thereby producing the magnetic and non-magnetic regions.

These and other aspects of the present invention will be more apparent from the following description.

DETAILED DESCRIPTION

In accordance with the present invention, magnetic films are produced with magnetic and non-magnetic regions. Ion irradiation is used to transform a region of a film from an ordered structure to a disordered structure. In one embodiment, the resultant disordered region is non-magnetic. In another embodiment, the irradiated disordered region is magnetic.

As used herein, the term "magnetic" means ferromagnetic or ferrimagnetic. The term "non-magnetic" means paramagnetic, antiferromagnetic or diamagnetic, and also includes weakly magnetic materials. The films produced in accordance with the present invention include distinct magnetic regions and non-magnetic regions. The non-magnetic regions may have remanence, saturation moment or coercivity properties which are at least 2 times less than the remanence, saturation moment or coercivity properties of the magnetic material. Typically, the remanence, saturation moment or coercivity properties of the non-magnetic material are at least 5 or 10 times less than the remanence, saturation moment or coercivity properties of the magnetic material.

As used herein, the term "ordered" means a chemically ordered crystal structure containing at least two elements (e.g., A and B) where, for example, the A atoms are arranged on one set of atomic sites/sublattice and the B atoms are arranged on a different set of atomic sites/sublattice. The term "disordered" means a chemically disordered crystal structure in which different atomic species are not restricted to different atomic sites or crystal sublattices, e.g., the elemental atoms may be randomly substituted on the atomic sites. For example, in disordered $CrPt_3$, the Cr and Pt sites may be randomly substituted to form an fcc structure that is non-magnetic.

In one embodiment of the present invention, ion beam implantation is used to pattern media into ordered magnetic islands surrounded by disordered non-magnetic material using, for example, masking schemes with patterned protective coatings or non-contact shadow masks. These patterns are useful for bit-patterned magnetic recording media as well as servo patterned media applications, both of which may be used in disc-drive systems.

Figure 1:
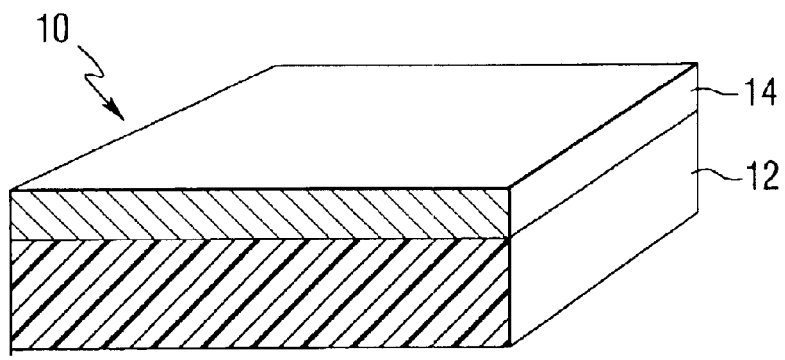
FIG. 1 is a partially schematic sectional isometric view of a magnetic film on a substrate.

FIG. 1 schematically illustrates a magnetic structure 10 including a substrate 12 and a magnetic film 14. The substrate 12 may comprise silicon nitride coated silicon, alumina, magnesium oxide, glass or any other suitable material. The magnetic film 14 may comprise a metal alloy such as Cr-containing alloys, Mn-containing alloys, Fe-containing alloys, Co-containing alloys, Ni-containing alloys or the like. The metal alloy of the magnetic film 14 may comprise specific ordered compositions or intermetallics.

Suitable Cr-containing alloys for the magnetic film 14 may include Pt and/or Pd alloying additions. For example, a Cr—Pt alloy may comprise $CrPt_3$, which may be converted from an ordered magnetic material to a disordered non-magnetic material upon ion irradiation. Ordered $CrPt_3$ has the $L1_2$ fcc-derivative crystal structure and is magnetic (ferrimagnetic). Disordered $CrPt_3$ has an fcc-disordered crystal structure and is non-magnetic (paramagnetic). In the chemically ordered $L1_2$ phase, the material is magnetic with a large magneto-crystalline anisotropy of up to $8 \times 10^6$ erg/cc and a Curie temperature of about 200° C. Thus, chemically ordered $CrPt_3$ is a highly anisotropic magnetic material, while the disordered phase is non-magnetic. In accordance with an embodiment of the present invention, in a $CrPt_3$ film, a magnetic transition from the magnetic ordered phase to the non-magnetic disordered phase may be induced with ion irradiation, for example, using 200 keV $B^+$ ions with a dose density $10^{15}$ $B^+/cm^2$ for 200 nm thick films. Magnetically isolated grains and/or patterned structures may thus be produced by ion irradiation. This makes $CrPt_3$ highly suitable for magnetic recording applications, where thermal stability for smaller grains requires a transition to higher anisotropy materials.

Although ion irradiation of $CrPt_3$ films is primarily described herein, $CrPt_3$ is only one member of a generic class of materials that exhibit an atomic order-disorder phase transformation in conjunction with a magnetic to non-magnetic (or vice versa) transition. Another such material is $(Cr,Mn)Pt_3$, which may be converted from an ordered magnetic material to a disordered non-magnetic material upon ion irradiation. Another material is the MnAl τ-phase, which may be converted from an ordered magnetic material to a disordered non-magnetic material upon ion irradiation. Iron alloys may also be used as the magnetic film. Suitable Fe-containing alloys for the magnetic film 14 may comprise Pt or Pd. Particularly suitable Fe-containing alloys include $FePt_3$ and FeAl, which may be converted from an ordered non-magnetic material to a disordered magnetic material upon ion irradiation.

Any desired thickness of the magnetic film 14 may be used. For example, a thickness of from about 2 to about 2,000 nm may be suitable. For magnetic recording media, a thickness of from about 5 to about 200 nm may be used, for example, from about 10 to about 50 nm.

The magnetic film 14 may be deposited on the substrate 12 by any suitable technique such as sputtering, molecular beam epitaxial growth or the like. During or after deposition, if desired, the magnetic layer 14 may undergo treatment such as heat treating in order to yield desired magnetic properties. For example, the deposited film may be annealed in order to create or enhance magnetic properties and/or change the crystal structure of the film.

Figure 2:
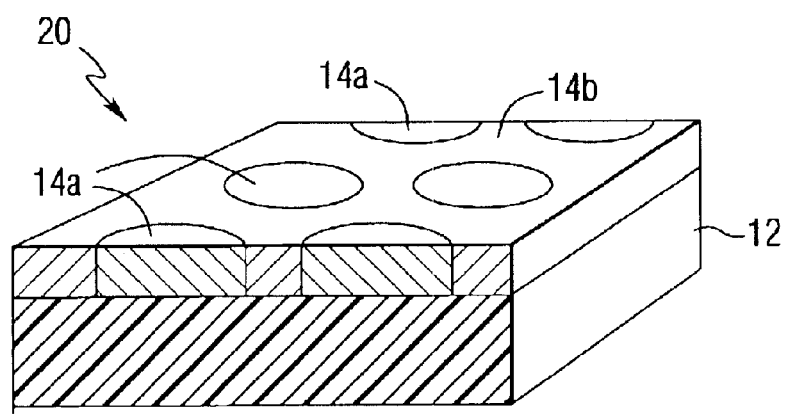
FIG. 2 is a partially schematic sectional isometric view of a patterned magnetic film on a substrate in accordance with an embodiment of the present invention. The patterned film includes isolated magnetic regions surrounded by non-magnetic regions.

FIG. 2 illustrates a patterned magnetic film in accordance with an embodiment of the present invention. In the embodiment shown in FIG. 2, a magnetic structure 20 similar to that shown in FIG. 1 has been subjected to ion irradiation in order to convert the magnetic film 14 shown in FIG. 1 into a patterned film including magnetic regions 14a surrounded by non-magnetic regions 14b. In the embodiment of FIG. 2, the non-magnetic regions 14b have been exposed to ion irradiation, while the isolated magnetic regions 14a have not been subjected to ion irradiation. Alternatively, some types of materials may be converted from non-magnetic to magnetic when they are transformed from an ordered to a disordered structure. In this case, the regions of the film exposed to the ion irradiation are disordered and magnetic, while the non-exposed regions are ordered and non-magnetic.

Patterning of the magnetic film 14 may be accomplished by techniques such as optical lithography, e-beam lithography, nano imprinting or shadow masking. For example, a standard photolithographic technique involves masking of the magnetic film over selected regions, e.g., the regions 14a, subjecting the masked film to ion irradiation to convert the unmasked regions to a disordered material, and removing the masking material to produce a pattern such as that shown in FIG. 2. Any suitable pattern size may be produced. For example, the regions 14a shown in FIG. 2 may have diameters of from about 1 nm to about 100 nm or more.

In addition to the pattern shown in FIG. 2, the present method may be used to form any other desired pattern. For example, isolated magnetic regions may be formed. As further examples, isolated or connected non-magnetic regions may be formed. Magnetic recording media for computer disc drive systems may be formed into bit patterns and/or servo patterns such as square or hexagonal grids with square or circular patches, straight or circular magnetic and non-magnetic strips, patterns interrupted with servo information, and the like.

In another embodiment of the present invention, ion implantation of a large area (e.g., a whole disc) may be achieved without masking of the data areas. For example, in a polycrystalline film of $CrPt_3$ the grain boundary areas may be more susceptible to chemical disordering. These regions of increased disorder reduce the direct magnetic exchange between adjacent grains. In magnetic recording media, this is a critical parameter determining the magnetic cluster size and the sharpness of the written transitions, as well as having implications for achievable areal densities and archival information lifetime.

Figure 3:
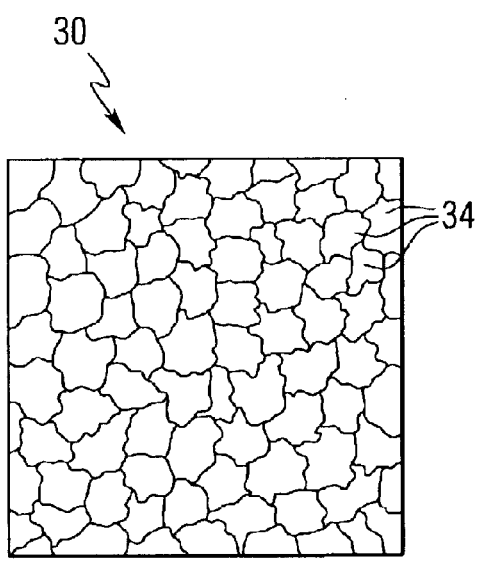
FIG. 3 is an illustration of the surface of a magnetic film showing individual grains of the magnetic material separated by grain boundaries.
Figure 4:
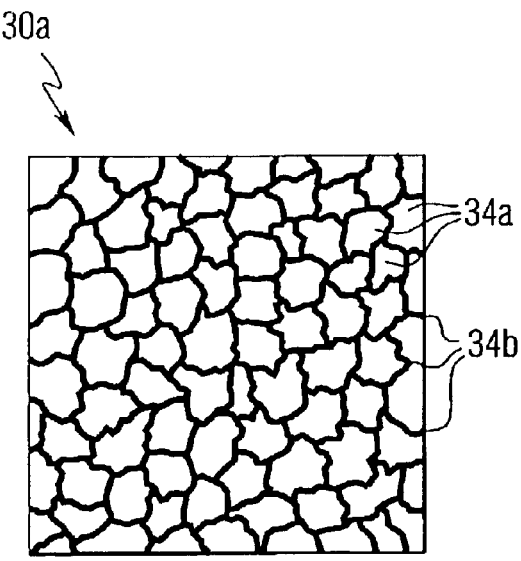
FIG. 4 is an illustration of the surface of a magnetic film as shown in FIG. 3, after the entire surface of the film has been subjected to ion irradiation. The ion irradiation treatment converts the grain boundaries to chemically disordered, non-magnetic regions between the magnetic grains to thereby magnetically decouple the magnetic grains.

FIGS. 3 and 4 illustrate an example of an ion irradiation process in accordance with this embodiment of the present invention. FIG. 3 illustrates the surface of a magnetic film 30 having grains 34 separated by grain boundaries. The entire surface of the magnetic film 30 shown in FIG. 3 may be subjected to ion irradiation in order to produce a magnetic film 30a as shown in FIG. 4, which comprises magnetic grains 34a separated by non-magnetic regions 34b. Upon ion irradiation, the regions 34b become disordered and non-magnetic. The irradiated material thus includes isolated magnetic grains 34a separated by disordered non-magnetic boundary regions 34b. The size of the magnetic grains 34a depends upon the grain structure of the magnetic film and can be controlled as desired. For example, average grain sizes of from about 1 nm to about 100 nm or more may be produced.

In accordance with the present invention, the irradiation process may be performed with different types of ion species such as He, B, C, N, Ne, Ar, Kr or Xe ions. One advantage of $B^+$ ions is that they have a low mass and their implantation results in local damage only. Another advantage of $B^+$ ions is that their relatively small size means that any remaining interstitial ions will not disturb the properties of the material significantly.

Suitable ion implantation energies may range from about 1 to about 2,000 keV, typically from about 10 to about 1,000 keV, depending upon the ion species used. For example, a $B^+$ ion implantation energy of from about 50 to about 500 keV may be suitable for many applications. Ion implantation dosages may range from about $10^{11}$ to about $10^{17}$ ions per $cm^2$, typically from about $10^{13}$ to about $10^{16}$ ions per $cm^2$. For example, boron ion implantation dosages may range from about $10^{13}$ to about $10^{15}$ $B^+$ ions per $cm^2$.

The following examples illustrate various aspects of the present invention, and are not intended to limit the scope of the invention.

Leybold-Heraeus Z-400 system under high vacuum conditions. A sputtering pressure of 10 mTorr was used and the base pressure was always less than $8 \times 10^{-7}$ Torr. A 100 W sputtering power was used for both targets. Changing the sputtering time varied the film thickness. Films were deposited as alternating layers of Cr and Pt, with a total of 20 bilayers. The overall film thickness was set to be 200 nm and the thickness of individual layers was thus set to 2.5 nm and 7.5 nm for Cr and Pt, respectively. These as-deposited films are non-magnetic (paramagnetic). The films were then rapidly thermally annealed (RTA) ex-situ in an inert Ar atmosphere for 5 minutes at a temperature of 850° C. The annealing results in a single phase ordered magnetic (ferrimagnetic) $CrPt_3$ thin film having $L1_2$ structure.

Based on stopping and range of ion in matter (SRIM) simulations, $B^+$ ions at 200 keV were deposited on the ferrimagnetic $CrPt_3$ film in doses ranging between $10^{13}$ and $10^{16} B^+/cm^2$. The magnetic properties of the samples were measured using Polar Kerr hysteresis loops and a vibrating sample magnetometer (VSM). Several X-Ray diffraction (XRD) configurations were used to investigate the structure and ordering degree of the annealed multilayer films. XRD was performed with a Philips X'pert System using Cu—$K_\alpha$ radiation.

Figure 5:
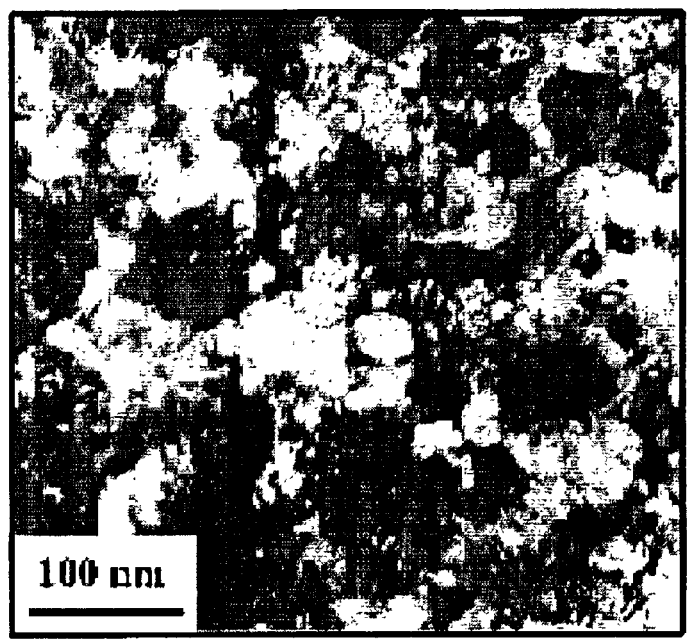
FIG. 5 is a micrograph of the surface of a $CrPt_3$ magnetic film after deposition and annealing, but before ion irradiation treatment.
Figure 6:
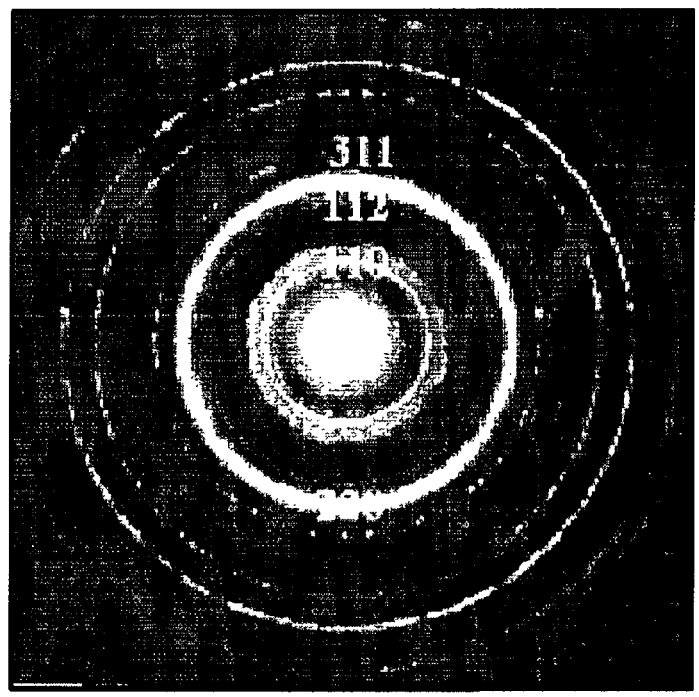
FIG. 6 is a transmission electron microscope (TEM) electron diffraction pattern from a $CrPt_3$ magnetic film after deposition and annealing, but before ion irradiation treatment.

FIG. 5 is a plan view micrograph and FIG. 6 is a TEM electron diffraction pattern of a sample, after annealing, but without any ion irradiation treatment. The film is (111) textured and consists primarily of the atomically ordered $L1_2$ $CrPt_3$ phase, with an average grain diameter of approximately 25 nm. XRD results confirm the existence of the ordered $L1_2$ $CrPt_3$ phase with an order parameter of approximately 0.8, with the remainder consisting overwhelmingly of fcc-disordered $CrPt_3$. The fine structure visible in some of the grains is attributed to Moiré fringes caused by overlapping grains. Rocking curve measurements revealed $CrPt_3$ (111) full-width at half-maximum (FWHM) peak widths as low as 1.8°.

Figure 7:
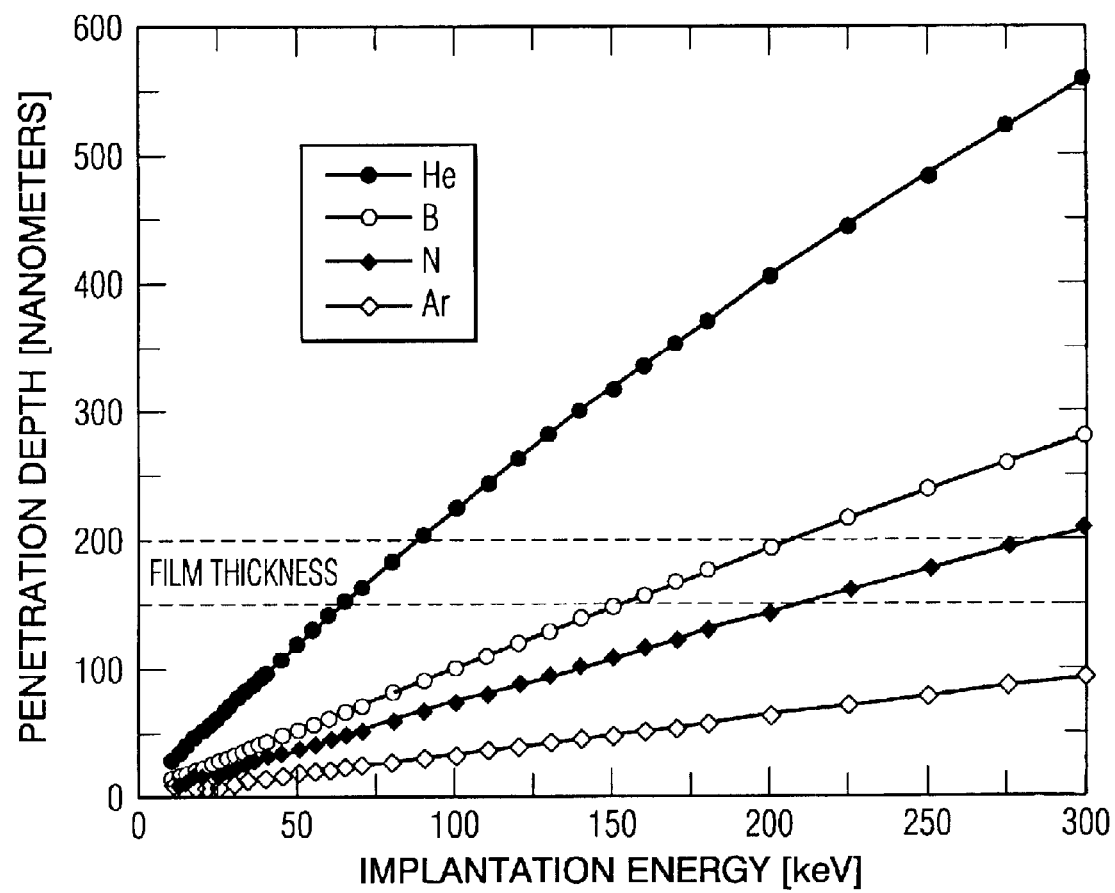
FIG. 7 is a graph of penetration depth versus implantation energy for different types of ions, illustrating stopping and range of ion in matter (SRIM) simulation results for ion implantation into a $CrPt_3$ magnetic film.

SRIM simulations were performed to select an ion species and implantation energy based on the desired penetration depth into 200 nm thick $CrPt_3$ films. The results of these calculations for He, B, N and Ar ion species are shown in FIG. 7. Although a film thickness of from 150 to 200 nm is shown in FIG. 7, other thicknesses may be used as described previously.

Boron ions with an implantation energy of 200 keV were selected as an approximate minimum energy needed to penetrate the sample films. Six nominally identical samples were subjected to $B^+$ ion implantation at varying doses as shown in Table 1, while a reference sample was left unexposed to ions.

TABLE 1

| | Ion Implantation Dosages for Samples ($B^+$ @ 200 keV) | | | | | | |
|---|---|---|---|---|---|---|---|
| Wafer # | 0 | 1 | 2 | 3 | 4 | 5 | 6 |
| Density ($B^+/cm^2$) | — | $1 \times 10^{13}$ | $1 \times 10^{14}$ | $5 \times 10^{14}$ | $1 \times 10^{15}$ | $5 \times 10^{15}$ | $1 \times 10^{16}$ |

EXAMPLES

Figure 8:
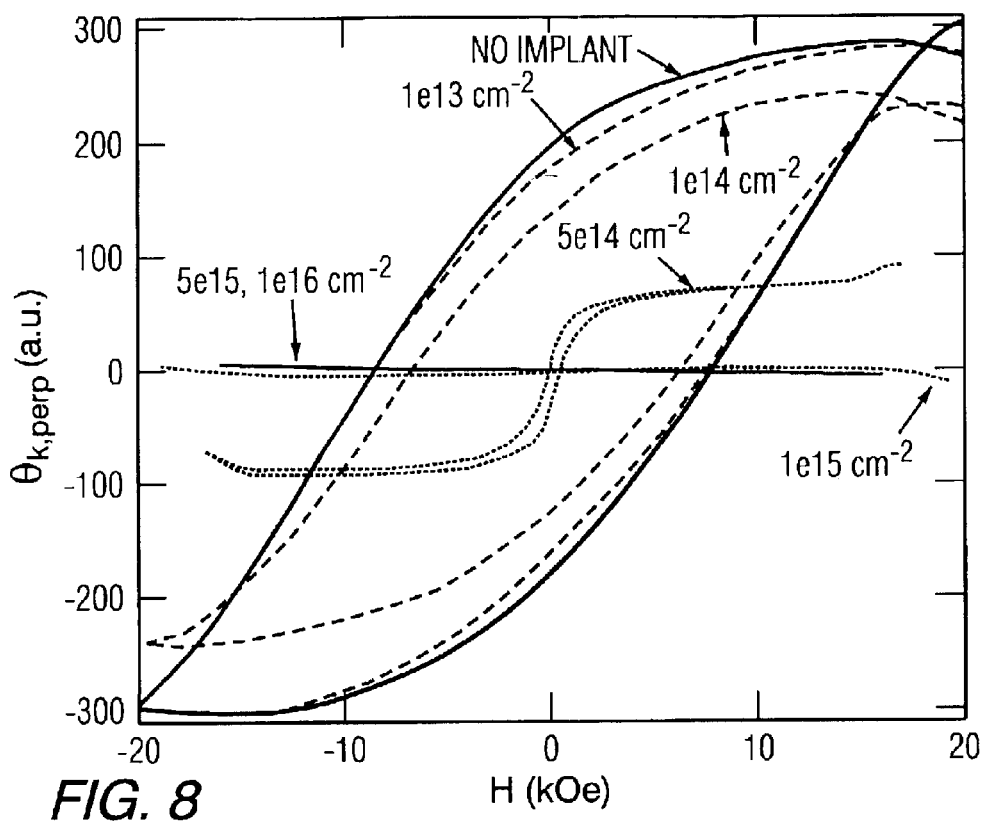
FIG. 8 illustrates hysteresis loops for different $CrPt_3$ film samples subjected to boron ion implantation at varying doses.
Figure 9:
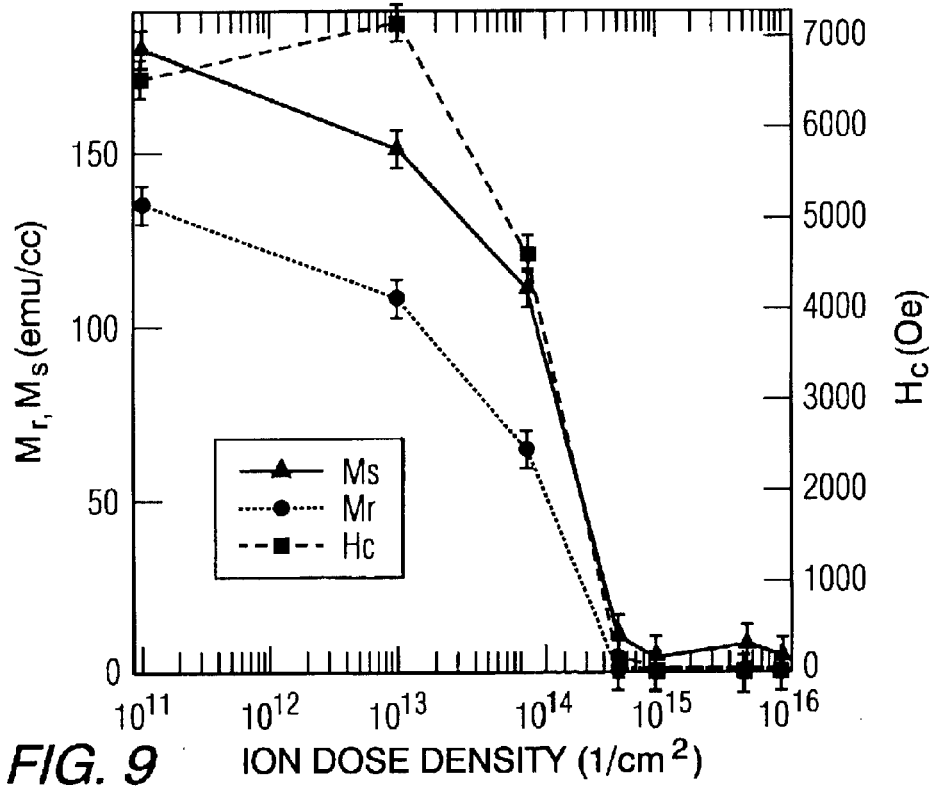
FIG. 9 is a graph of remanence, saturation moment and coercivity as a function of ion dose density for a $CrPt_3$ film subjected to boron ion irradiation.

Cr/Pt multilayer thin films were sputter deposited from two elemental targets onto (100) Si substrates which were coated with 500 nm of amorphous $Si_3N_4$. The deposition was accomplished by RF-diode Ar-ion sputtering in a FIG. 8 shows perpendicular hysteresis loops of the samples of Table 1 as measured on a magneto-optical Kerr looper. Magnetic properties derived from the VSM hysteresis loops, coercivity ($H_c$), saturation magnetization ($M_s$) and remanent magnetization ($M_r$) are shown versus ion-dose density in FIG. 9. It will be appreciated that the initial set of points plotted in FIG. 9 at $10^{11}$ are actually those samples that have NO IMPLANT. The initial coercivity is $H_{c0} \approx 6.5$ kOe and first slightly increases and then sharply decreases with increasing ion-dose density, until it vanishes at an ion-dose density of $1 \times 10^{15}$ $B^+/cm^2$. The saturation and remanent magnetization are both monotonically decreasing functions of ion-dose density. Thus, a magnetic (ferrimagnetic) to non-magnetic (paramagnetic) transition takes place at an ion-dose density of around $10^{15}$ $B^+/cm^2$.

Figure 10:
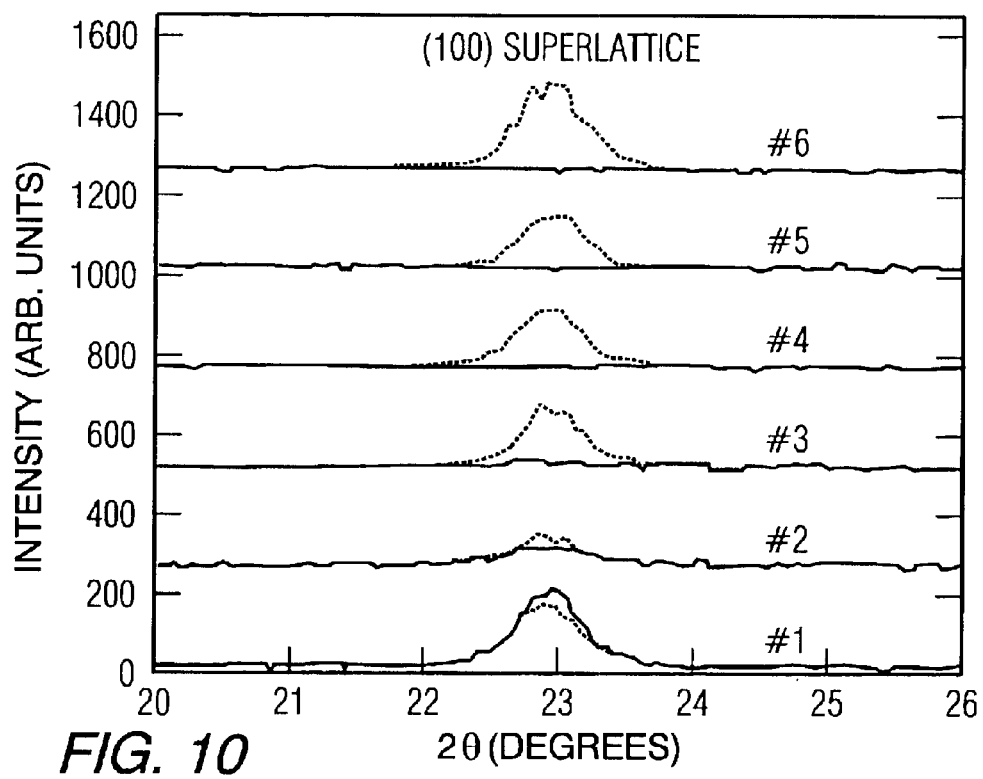
FIG. 10 shows x-ray diffraction patterns at the $CrPt_3$ (100) superlattice peak for samples subjected to different boron ion dose densities, before and after irradiation.
Figure 11:
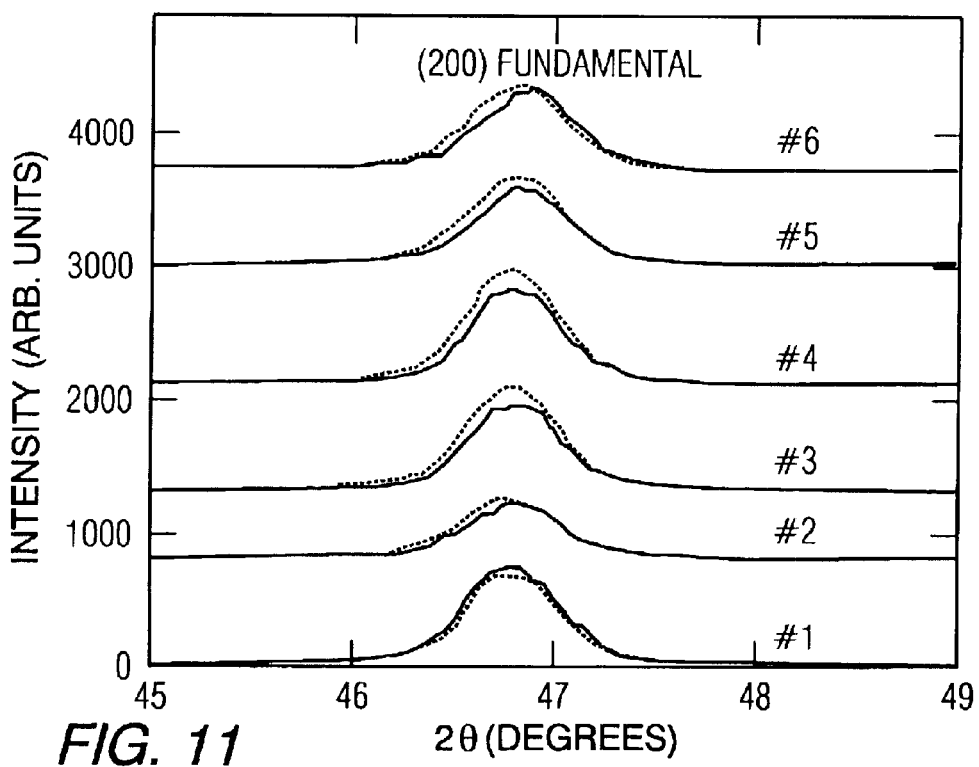
FIG. 11 shows x-ray diffraction patterns at the $CrPt_3$ (200) fundamental peak for samples subjected to different boron ion dose densities, before and after irradiation.

Tilted X-ray diffraction 2θ/θ scans were done with ψ=55° for each sample of Table 1 both before and after ion implantation. The results are shown for the superlattice and fundamental peaks in FIGS. 10 and 11, respectively, with the dotted lines representing before implantation and the solid lines representing after implantation. The presence of the (100) superlattice peak in all samples before ion implantation indicates the existence of the ordered $L1_2$ $CrPt_3$ phase. However, with increasing ion dose, the (100) superlattice peak is seen to decrease in intensity and finally disappear at an ion-dose density of approximately $1 \times 10^{15}$ $B^+/cm^2$ confirming the change of phase. Since the (200) fundamental peak is seen for all samples, regardless of ion-dose density, the phase change is from the ordered-$L1_2$ phase to the fcc-disordered phase. There is very little change in the peak location or width for the fundamental peaks. Therefore, the ion implantation has minimal impact upon the fundamental fcc structure of the $CrPt_3$ samples.

During ion implantation, 200 nm thick ordered $L1_2$ $CrPt_3$ films undergo a structural and magnetic phase transition to the fcc-disordered $CrPt_3$ phase at an ion-dose density of about $1 \times 10^{15}$ $B^+/cm^2$ when an $B^+$ ion energy of 200 keV is used. The results from magnetic measurements of coercivity, saturation magnetization, remanent magnetization and x-ray diffraction measurements are all consistent with this conclusion.

An advantage of the present invention is that a material can be patterned to break substantially all magnetic coupling between neighboring regions. Another advantage is the small perturbation on the surface roughness resulting from the patterning process, since the irradiated areas have a similar density as the original material.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic recording medium comprising:
   a substrate; and
   an ion irradiated magnetic recording film on the substrate, wherein the film comprises an alloy selected from Cr, Mn, Fe and Ni alloys and includes irradiated, ordered magnetic grains separated by irradiated, disordered non-magnetic grain boundry regions.

2. The magnetic recording medium of claim 1, wherein the film comprises a Cr alloy.

3. The magnetic recording medium of claim 2, wherein the Cr alloy comprises Pt and/or Pd.

4. The magnetic recording medium of claim 2, wherein the alloy comprises $CrPt_3$.

5. The magnetic recording medium of claim 4, wherein the alloy further comprises Mn.

6. The magnetic recording medium of claim 1, wherein the film comprises a Mn alloy.

7. The magnetic recording medium of claim 6, wherein the Mn alloy comprises MnAl τ-phase.

8. The magnetic recording medium of claim 1, wherein the film comprises an Fe alloy.

9. The magnetic recording medium of claim 8, wherein the Fe alloy comprises $FePt_3$ and/or FeAl.

10. The magnetic recording medium of claim 1, wherein the film has been irradiated by ions selected from He, B, C, N, Ar, Ne, Kr and Xe ions.

11. The magnetic recording medium of claim 1, wherein the film has been irradiated by B ions.

* * * * *

UNITED STATES PATENT AND TRADEMARK OFFICE
CERTIFICATE OF CORRECTION

PATENT NO. : 6,849,349 B2
APPLICATION NO. : 10/274768
DATED : February 1, 2005
INVENTOR(S) : Timothy John Klemmer et al.

It is certified that error appears in the above-identified patent and that said Letters Patent is hereby corrected as shown below:

Cover Page
Other Publications (Page 2, Column 1)
"T. Devolder et al.,..."after "Applied Physics Letters," change "vol. 75, No. 3, Jul. 19, 1999, pp. 403-405." to read "vol. 74, No. 22, May 31, 1999, pp. 3383-3385.".

Signed and Sealed this

Fourteenth Day of November, 2006

JON W. DUDAS
*Director of the United States Patent and Trademark Office*